G. KOSEL.
CLOSING CONTRIVANCE FOR CORSETS AND THE LIKE.
APPLICATION FILED AUG. 4, 1914.
1,133,479.
Patented Mar. 30, 1915.
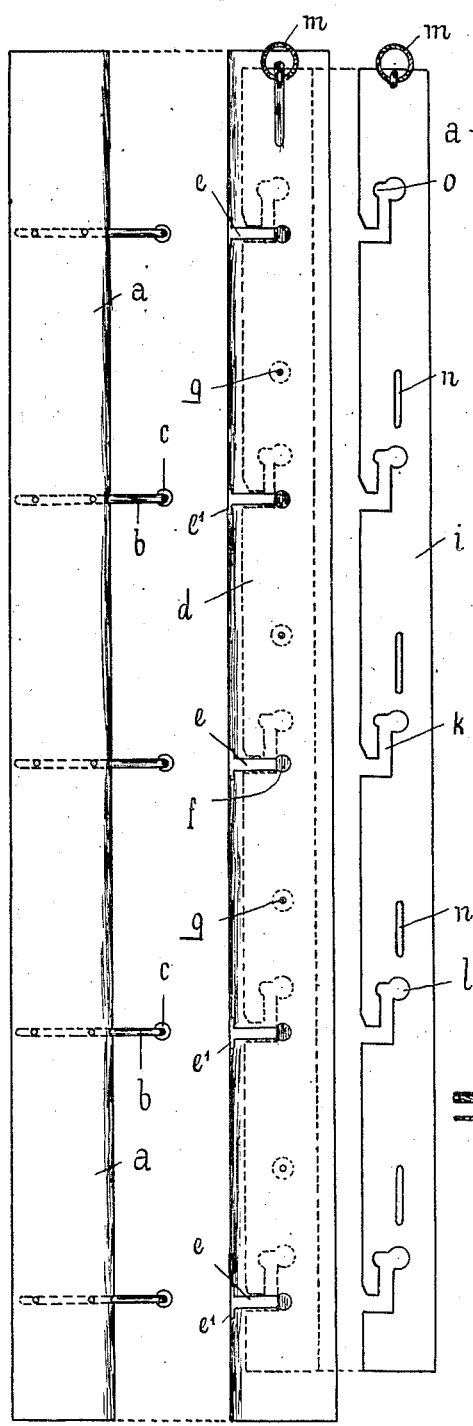
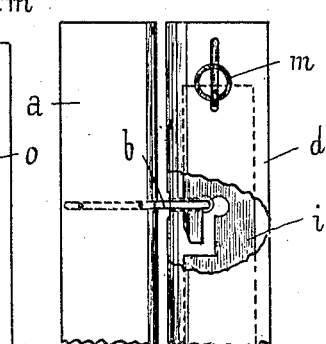
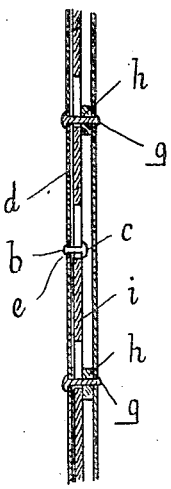
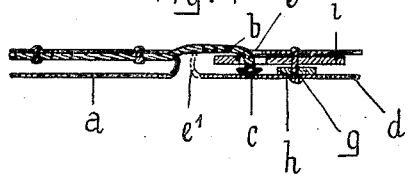

UNITED STATES PATENT OFFICE.

GEORG KOSEL, OF MEISSEN, GERMANY.

CLOSING CONTRIVANCE FOR CORSETS AND THE LIKE.

1,133,479.  Specification of Letters Patent.  Patented Mar. 30, 1915.

Application filed August 4, 1914. Serial No. 855,033.

*To all whom it may concern:*

Be it known that I, GEORG KOSEL, a subject of the King of Saxony, and resident of Meissen, Germany, have invented certain new and useful Improvements in Closing Contrivances for Corsets and the like, of which the following is a specification.

This invention relates to an improved closing contrivance for corsets and the like, which is so constructed that the same can be disengaged instantaneously by a simple manipulation.

The accompanying drawing shows the subject matter of the invention.

Figure 1 is a front view of the same in open position, showing at the same time the closing bar proper detached therefrom, Fig. 2 is a fragmentary front view of the same in closed position, Fig. 3 is a sectional side view, and Fig. 4 a cross-section, of the same.

The device comprises two double-walled bars of channel cross-section, which consist of blade steel or other suitable material and which are fixed to the front edges of the corset, for which purpose the fabric of the latter is preferably inserted in the channels of the bars. One of said bars, $a$, carries on projecting wires $b$ buttons $c$. The latter are adapted to engage with slots $e$ with widened outer ends $e^1$ in one wall of the other bar $d$, said slots terminating at their inner ends in eyes $f$. The eye-bar $d$ is provided with inner stays $g$ to keep the walls of the same at proper distances from each other. On the stays $g$ spacing members $h$ are arranged, between which and one wall of the bar $d$ a sliding-bar $i$ is movably arranged, the same being mounted over the stays $g$ by slots $n$ therein. Said sliding-bar $i$ carries double-bent slots $k$ forming hooks thereon and which at their inner ends terminate in eyes $l$ adapted to eventually coincide with the eyes $f$ in the bar $d$ (Fig. 2).

In this position, the buttons are inserted in the eyes and the corset is laced from behind, whereby the wires of the buttons are firmly pressed against the upper corners $o$ of the slots $k$, which are recessed for arresting the wires therein, the same being prevented from leaving the slots by the hooks formed by the slots $k$ closing the entrance of the slots $e$.

To unlock the device, the sliding-bar $i$ is moved in such a way that the outer ends of their slots $k$ coincide with the outer ends of the slots $e$ in the bar $d$ (Fig. 1), whereby all the buttons are allowed to leave said slots at a time. For its easy manipulation, the sliding-bar $i$ is fitted with a handle $m$, which projects beyond the bar $d$ through a slot in the latter.

What I claim, is:—

A closing contrivance for corsets and the like, comprising in combination, two double-walled bars of channel cross-section, one of the same being provided with projecting buttons and one wall of the other bar with slots and eyes at the inner ends of the same adapted to engage with said buttons, a sliding-bar within the eye-bar adapted to be moved therein in longitudinal direction and provided with double-bent slots forming hooks thereon and having recessed upper corners and eyes at their inner ends adapted to eventually coincide with the eyes in the eye-bar to allow of the passage of the buttons therethrough, the slots in the eye-bar being closed in this position by the hooks formed by the eyes in the sliding-bar, and an outwardly projecting handle on said sliding-bar to operate the latter and to permit of the outer ends of said slots in the eye-bar and in the sliding-bar coinciding with each other for a simultaneous disengagement of all said buttons, substantially as described and shown.

GEORG KOSEL.

Witnesses:
LEO A. BERGHOLZ,
JAMES L. A. BURRELL.